(12) United States Patent
Fothergill et al.

(10) Patent No.: US 11,030,534 B2
(45) Date of Patent: Jun. 8, 2021

(54) SELECTING AN ENTITY FROM A KNOWLEDGE GRAPH WHEN A LEVEL OF CONNECTIVITY BETWEEN ITS NEIGHBORS IS ABOVE A CERTAIN LEVEL

(71) Applicant: LONGSAND LIMITED, Cambridge (GB)

(72) Inventors: Simon Fothergill, Cambridge (GB); Rachel M. Tochnell, Cambridge (GB); Christopher Ogden, Cambridge (GB)

(73) Assignee: LONGSAND LIMITED, Cambridgeshire (GB)

(*) Notice: Subject to any disclaimer, the term of this patent is extended or adjusted under 35 U.S.C. 154(b) by 858 days.

(21) Appl. No.: 15/545,030

(22) PCT Filed: Jan. 30, 2015

(86) PCT No.: PCT/EP2015/051920
§ 371 (c)(1),
(2) Date: Jul. 20, 2017

(87) PCT Pub. No.: WO2016/119874
PCT Pub. Date: Aug. 4, 2016

(65) Prior Publication Data
US 2017/0364808 A1    Dec. 21, 2017

(51) Int. Cl.
*G06N 5/00*     (2006.01)
*G06N 5/02*     (2006.01)
*G06F 16/901*   (2019.01)

(52) U.S. Cl.
CPC ......... *G06N 5/022* (2013.01); *G06F 16/9024* (2019.01); *G06N 5/00* (2013.01)

(58) Field of Classification Search
CPC ............. G06F 16/245; G06F 16/285; G06F 16/24578; G06F 16/9024; G06N 5/02
USPC ...................................................... 706/15, 45
See application file for complete search history.

(56) References Cited

U.S. PATENT DOCUMENTS

| | | | |
|---|---|---|---|
| 7,580,918 B2 * | 8/2009 | Chang | G06F 16/20 |
| 8,229,883 B2 | 7/2012 | Brauer et al. | |
| 8,510,302 B2 | 8/2013 | Sweeney et al. | |
| 2011/0282888 A1 | 11/2011 | Koperski et al. | |
| 2012/0016805 A1 | 1/2012 | Graupner et al. | |
| 2012/0158633 A1 | 6/2012 | Eder | |
| 2013/0226616 A1 * | 8/2013 | Nigam | G06Q 10/00 705/3 |
| 2014/0040233 A1 | 2/2014 | Ozonat et al. | |
| 2014/0337306 A1 * | 11/2014 | Gramatica | G06F 16/2471 707/706 |

(Continued)

FOREIGN PATENT DOCUMENTS

WO    2014/127500    8/2014

OTHER PUBLICATIONS

Vargas, S.G.J., "A Knowledge-Based information Extraction Prototype for Data-Rich Documents in the Information Technology Domain," Diss. National University of Columbia, Bogota, 2008, 173 pages.

(Continued)

*Primary Examiner* — David R Vincent

(57) ABSTRACT

A method may include selecting a particular entity from a knowledge graph when a level of connectivity between entities in the knowledge graph that are neighbors to the particular entity is above a certain level and determining whether the particular entity is in a character string.

20 Claims, 5 Drawing Sheets

(56) References Cited

U.S. PATENT DOCUMENTS

| | | | | |
|---|---|---|---|---|
| 2015/0006512 | A1* | 1/2015 | Alfonseca | G06F 40/258 707/722 |
| 2015/0169758 | A1* | 6/2015 | Assom | G06F 16/36 707/603 |
| 2015/0269231 | A1* | 9/2015 | Huynh | G06F 16/738 707/722 |
| 2016/0117349 | A1* | 4/2016 | Segaran | G06F 16/215 707/692 |

OTHER PUBLICATIONS

Ricard V. Solé et al: "Ambiguity in language networks" Mar. 13, 2014, 19 pages.

Moro, A. et al., "Entity Linking meets Word Sense Disambiguation: a Unified Approach," Transactions of the Association for Computational Linguistics 2, 2014, pp. 231-244.

Hakimov, S. et al., "Named Entity Recognition and Disambiguation using Linked Data and Graph-based Centrality Scoring," Proceedings of the 4th International workshop on semantic web information management, ACM, 2012, 7 pages.

Hao He et al: BLINKS: Ranked Keyword Searches on Graphs, SIGMOD'07, Jun. 11-14, 207, Beijing, China, 12 pages.

Wang, P. et al., Improving Text Classification by Using Encyclopedia Knowledge, Seventh IEEE International Conference on Data Mining, 2007, pp. 332-341.

Wang, X. et al., "Disambiguating the species biomedical named entities sing natural language parsers," Bioinformatics 26.5: 2010, pp. 661-667.

Zhou, B., Wikipedia-Graph Based Key Concept Extraction Towards News Analysis, 2009 IEEE Conference on Commerce and Enterprise Computing, 2009, pp. 121-128.

Hachey, B. et al., "Graph-based Named Entity Linking with Wikipedia," Web Information System Engineering—WISE 2011, Springer Bertin Heidelberg, 2011, pp. 213-226.

* cited by examiner

SELECTING AN ENTITY FROM A KNOWLEDGE GRAPH WHEN A LEVEL OF CONNECTIVITY BETWEEN ITS NEIGHBORS IS ABOVE A CERTAIN LEVEL

BACKGROUND

Sometimes graphs, such as knowledge graphs (e.g., sometimes called concept graphs), may be used to illustrate semantic relationships between entities (e.g., concepts) in a data base, such as a knowledge base (e.g., an encyclopedic data base). Wikipedia is an example of a knowledge base. Sometimes strings of text, such as documents, might be searched to determine whether they include entities in a knowledge base.

DETAILED DESCRIPTION

Figure 1:
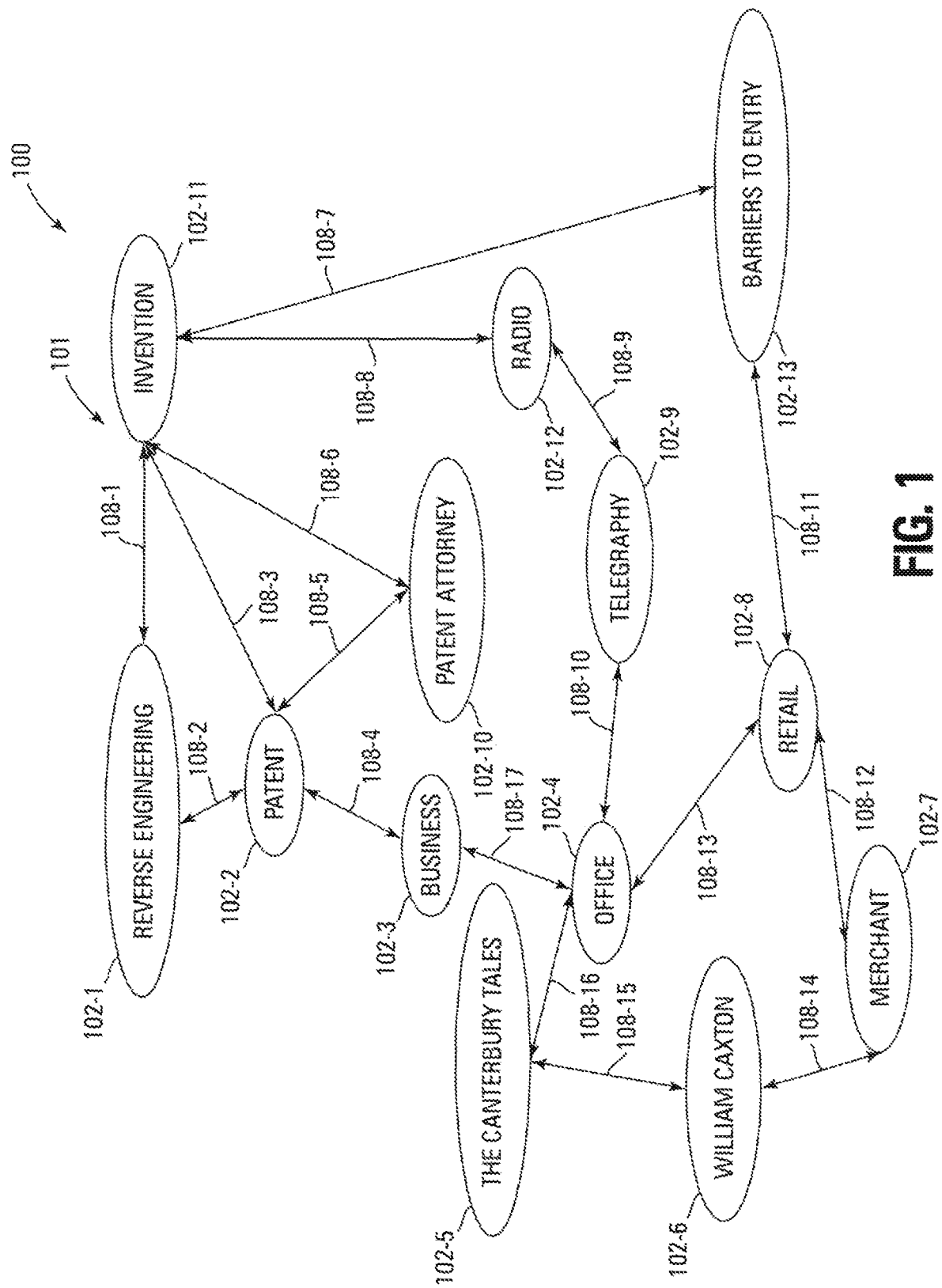
FIG. 1 is an example of a portion of a knowledge graph.

FIG. 1 is an example of a portion 101 of a knowledge graph 100, e.g. sometimes referred to as a concept graph. The portion 101 of knowledge graph 100 includes a plurality of entities 102 (.g., entities 102-1 to 102-13). Each of the entities 102-1 to 102-13 might include a specific concept. For example, an entity in a knowledge graph, such as an entity 102 in knowledge graph 100, might include a name, e.g., of a person, place, organization, disease, organism, etc., a brand, a title, e.g., of a book, movie, etc., a phrase, or the like. Related (e.g., semantically related) entities 102 are connected by links 108 (e.g., links 108-1 to 108-17). Links in a knowledge graph, such as links 108-1 to 108-17, may sometimes be referred to as edges, for example.

Knowledge graph 100 may correspond to a knowledge base, such as Wikipedia, where each of the entities 102-1 to 102-13 might correspond to a page within the knowledge base. For example, links 108 might correspond to hyperlinks within the knowledge base.

Sometimes character strings, such as strings or chunks of text, (e.g., text documents) might be searched to determine whether they include entities in a knowledge base. For example, a string of text might be searched to determine whether it includes entities that correspond to pages in a knowledge base. For example, a hyperlink might be created between a portion of a text string, such as a name in a text document (e.g., a newspaper article), and an entity in a knowledge base determined to correspond to the portion of the text string. Although knowledge graphs have been used, in some instances, for selecting entities to be searched for in strings of text, improvements are desired.

Figure 2:
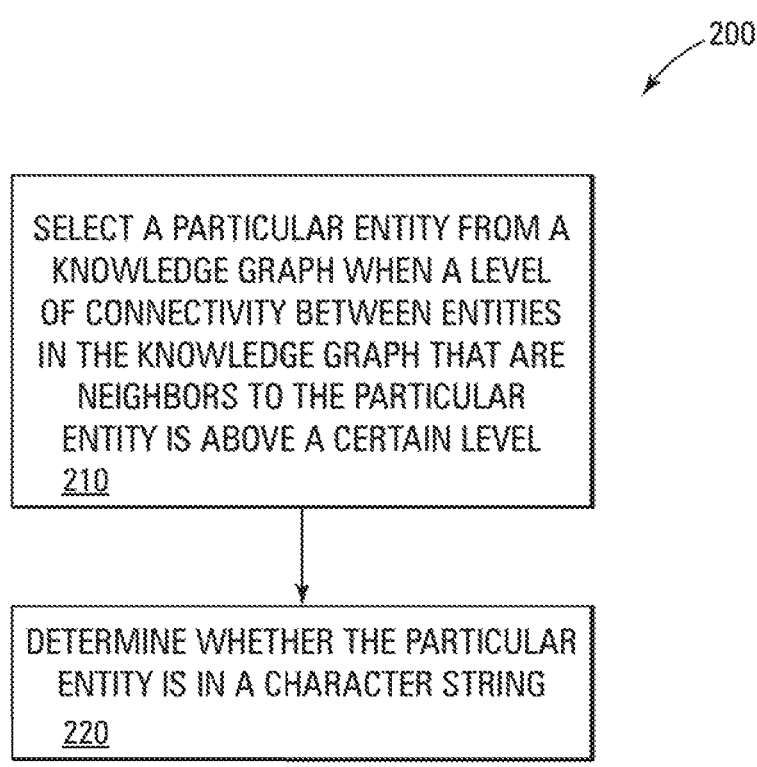
FIG. 2 is flowchart of an example of a method.

FIG. 2 is flowchart of an example method 200 that might be implemented in a computer, such as a server computer. For example, method 200 might be encoded as instructions that are executable by a processor of the computer.

In block 210, a particular entity in a knowledge graph, such as knowledge graph 100 in FIG. 1, is selected when a level of connectivity between entities in the knowledge graph that are neighbors to the particular entity is above a certain level. At block 220, method 200 determines whether the particular entity is in a character string.

For example, the level of connectivity between entities in the knowledge graph that are neighbors to the particular entity is a measure of how specific a meaning has the particular entity. For example, selecting the particular entity when a level of connectivity between entities in the knowledge graph that are neighbors to the particular entity is above a certain level may select an entity that has a more specific meaning than another entity where the level of connectivity between entities in the knowledge graph that are neighbors to the other entity is lower than the certain level.

Method 200, e.g., a computer performing method 200, may receive knowledge graph 100, e.g., as an input from a data network, such as from a website (e.g., Wikipedia) on the Internet, and the character string, e.g., as an input from a user. Modifications might not be made to knowledge graph 100 after it is received, for example.

In some examples, the particular entity might be ranked based on the level of connectivity between the entities in the knowledge graph that are neighbors to the particular entity, and the particular entity might be selected based on its rank. For example, an entity whose neighbors have a higher level of connectivity therebetween might be ranked higher than an entity whose neighbors have a lower level connectivity therebetween. For example, an entity having a higher rank might be selected over an entity having a lower rank.

A connectivity coefficient, such as a clustering coefficient, of the particular entity may be used as a measure of the level of the connectivity between entities in the knowledge graph that are neighbors to the particular entity. A clustering coefficient, for example, may be used as a ranking measure of an entity. For example, the greater the clustering coefficient the greater the connectivity between entities in the knowledge graph that are neighbors to the particular entity.

A clustering coefficient, for example, may be a measure of the connectivity between an entity in a knowledge graph, such as an entity being ranked, and entities in the knowledge graph that are neighbors to that entity. For example, a clustering coefficient of an entity may be used as a measure of how specific a meaning has that entity, e.g., a measure of how narrowly defined is that entity.

Ranking a particular entity based on the level of connectivity between entities in the knowledge graph that are neighbors to the particular entity in a knowledge graph allows the human knowledge that may be used to make the connections (e.g., the semantic connections) between the entities in the knowledge graph to be captured. For example, connections between entities in a knowledge graph may be based on human knowledge of the semantic relationships between those entities.

Clustering coefficients allow different contexts in which an entity may be used to be captured. For example, a clustering coefficient of an entity may be a measure of the number of topics related to that entity, e.g., the higher the coefficient of an entity, the fewer topics related to that entity, and thus the more specific the meaning of that entity.

A suitable clustering coefficient of an entity, such as an entity being ranked, might be the number of closed triples that include the entity and two of its neighbors divided by the number of connected triples that include the entity and two of its neighbors. For example, such a clustering coefficient of an entity may be proportional to the level of interconnectivity between entities that are neighbors to that entity.

An entity 102-2 in FIG. 1 that includes the word "PATENT" might be selected based on the level of connectivity between its neighboring entities, e.g., entities that are directly connected to entity 102-2. For example, two entities that are directly connected in knowledge graph 100 are connected by a single link 108. That is, there are no intervening entities between neighboring entities. Therefore, the entities that are neighbors to entity 102-2 are entity 102-1, including the words "REVERSE ENGINEERING," entity 102-3, including the word "BUSINESS," entity 102-10, including the words "PATENT ATTORNEY," and entity 102-11, including the word "INVENTION."

A clustering coefficient for entity 102-2 and its neighboring entities 102-1, 102-3, 102-10, and 102-11 may determine the level of connectivity between the entities 102-1, 102-3, 102-10, and 102-11 that are neighbors to entity 102-2. The clustering coefficient for entity 102-2 and its neighboring entities 102-1, 102-3, 102-10, and 102-11 may be referred to as the clustering coefficient of entity 102-2, for example.

A clustering coefficient of entity 102-2, for example, might be the number of closed triples that include entity 102-2 and two of its neighbors divided by the number of connected triples that include entity 102-2 and two of its neighbors. For example, such a clustering coefficient of entity 102-2 may be proportional to the level of interconnectivity between entities 102-1, 102-3, 102-10, and 102-11 that are neighbors to entity 102-2. Such a clustering coefficient may be used is a ranking measure of an entity, such as entity 102-2, in a knowledge graph, such as knowledge graph 100. For example, a clustering coefficient may be used as a selection criterion for an entity to be compared to a character string.

There are six (6) connected triples that include entity 102-2 and two of its neighbors. These are 1: entity 102-1, entity 102-2, and entity 102-3; 2: entity 102-1, entity 102-2, and entity 102-10; 3: entity 102-1, entity 102-2, and entity 102-11; 4: entity 102-11, entity 102-2, and entity 102-10; 5: entity 102-11, entity 102-2, and entity 102-3; and 6: entity 102-3, entity 102-2, and entity 102-10. There two (2) closed triples that include entity 102-2 and two of its neighbors. These are entity 102-1, entity 102-2, and entity 102-11 and entity 102-11, entity 102-2, and entity 102-10. The clustering coefficient for entity 102-2 is thus 2/6=0.33.

The entities that are neighbors to entity 102-11 are entity 102-1, entity 102-2, entity 102-10, entity 102-12 including the word "RADIO," and entity 102-13, including the phrase "BARRIERS TO ENTRY." The clustering coefficient of entity 102-11 may determine the level of connectivity between the entities 102-1, 102-2, 102-10, 102-12, and entity 102-13 that are neighbors to entity 102-11.

There are ten (10) connected triples that include entity 102-11 and two of its neighbors. These are 1: entity 102-1, entity 102-11, and entity 102-2; 2: entity 102-1, entity 102-11, and entity 102-10; 3: entity 102-1, entity 102-11, and entity 102-12; 4: entity 102-1, entity 102-11, and entity 102-13; 5: entity 102-2, entity 102-11, and entity 102-10; 6: entity 102-2, entity 102-11, and entity 102-12; 7: entity 102-2, entity 102-11, and entity 102-13; 8: entity 102-10, entity 102-11, and entity 102-12; 9: entity 102-10, entity 102-11, and entity 102-13; and 10: entity 102-12, entity 102-11, and entity 102-13. There two (2) closed triples that include entity 102-11 and two of its neighbors. These are entity 102-1, entity 102-11, and entity 102-2 and entity 102-2, entity 102-11, and entity 102-10. The clustering coefficient for entity 102-11 is thus 2/10=0.20.

The entities, that are neighbors to entity 102-4, including the word "OFFICE," are entity 102-3, entity 102-5, including the title "THE CANTERBURY TALES," entity 102-8 including the word "RETAIL," and entity 102-9, including the word "TELEGRAPHY." The clustering coefficient of entity 102-4 may determine the level of connectivity between the entities 102-3, 102-5, 102-8, and 102-9 that are neighbors to entity 102-4.

There are six (6) connected triples that include entity 102-2 and two of its neighbors. These are 1: entity 102-3, entity 102-4, and entity 102-5; 2: entity 102-3, entity 102-4, and entity 102-9; 3: entity 102-3, entity 102-4, and entity 102-8; 4: entity 102-5, entity 102-4, and entity 102-8; 5: entity 102-5, entity 102-4, and entity 102-9; and 6: entity 102-8, entity 102-4, and entity 102-9. There are zero (0) closed triples. The clustering coefficient for entity 102-4 is thus 0/6=0.

A higher clustering coefficient for an entity means a greater level of connectivity between entities in the knowledge graph that are neighbors to that entity. In the present example, for which cluster coefficients have been calculated, entity 102-2, and thus "PATENT," would be ranked higher than entity 102-11, and thus "INVENTION," and entity 102-11 would be ranked higher than entity 102-4, and thus "OFFICE." Note that entity 102-2 might be selected over entities 102-11 and 102-4, and it might be determined whether entity 102-2 is in a character string.

Note that the clustering coefficients were determined directly from knowledge graph 100 that may be an original (e.g., raw), unmodified knowledge graph of a knowledge base, e.g., an as-received knowledge graph, such as a knowledge graph received directly from an outside source, such as Wikipedia. That is, no modifications may be made to knowledge graph 100 after it is received.

In some examples, a knowledge graph might be for an entire knowledge base, such as the entire knowledge base of Wikipedia, and every entity in that knowledge graph might be ranked based the level of connectivity between entities in the knowledge graph that are neighbors to the entity being ranked. For example, a clustering coefficient might be computed for every entity in the entire knowledge graph, e.g., of an entire knowledge base. The entities may then be ranked so that the rank decreases with decreasing connectivity of the entities in the knowledge graph that are neighbors to the respective entities being ranked. For example, entities may be ranked so that the rank decreases with decreasing clustering coefficient. The ranked entities night be listed in a list according to their ranks, for example.

In some examples, the list might contain certain ones, such as a subset, of the ranked entities. The certain ones of the ranked entities might include ranked entities having clustering coefficients above a particular value. In some examples, the certain ones of the ranked entities might include a certain number of the ranked entities. The certain ones of the ranked entities might be selected, and it might be determined whether the selected entities are in a character string, for example.

In some examples, ambiguous entities, e.g., entities with more than one meaning, might be added to the list. Note that the entities in a knowledge graph, such as knowledge graph 100, are unambiguous entities. However, a character string might include an ambiguous entity that corresponds to more than one of the unambiguous entities in the knowledge graph.

Returning to block 220 in FIG. 2, the determination of whether the particular entity is in a character string, such as text, e.g., a string of text, might be determined by comparing the particular entity to characters in the character string, for example. For example, the character string may be searched to determine whether the particular entity is in a character string. That is, the search might include comparing the particular entity to characters in the character string, for example. In some examples, a particular entity may be deemed to be in the character string when characters in the character string match the particular entity.

In some examples, comparing a particular entity to characters in the character string might include comparing certain ones of a plurality of ranked entities, such as the entities in the list of certain ones of the ranked entities described above, to the characters in the character string. That is, for example, the certain ones of the ranked entities might include ranked entities having clustering coefficients above a certain (e.g., particular) value.

Figure 3:
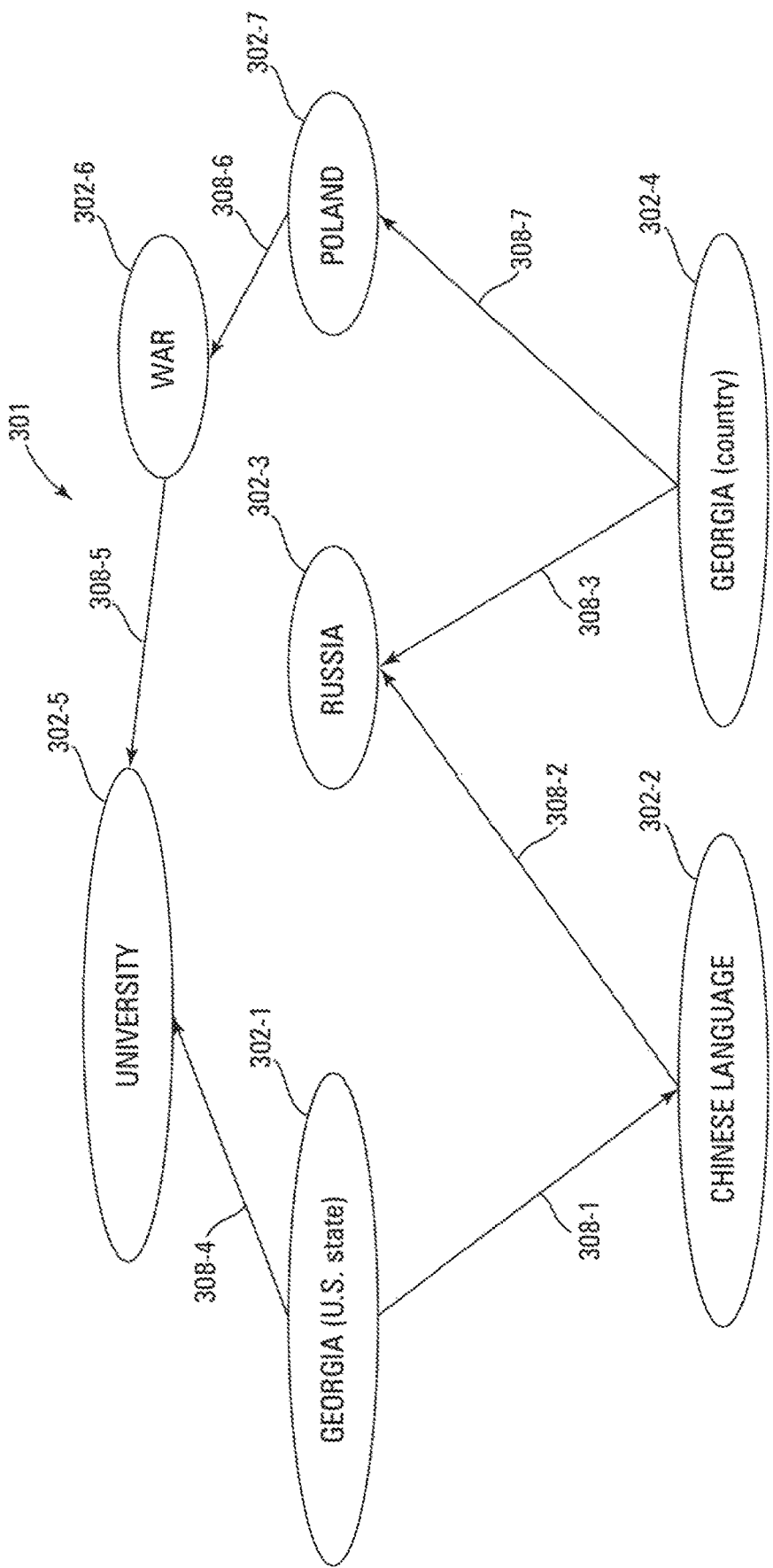
FIG. 3 is a simplified example of a portion of a knowledge graph.

FIG. 3 is a simplified example of a portion 301 of a knowledge graph, such as knowledge graph 100. Portion 301 includes a plurality of entities 302 (e.g., entities 302-1 to 302-7). Each of the entities 302-1 to 302-7 might include a specific concept. For example, entities 302-1, 302-2, 302-3, 302-4, 302-5, 302-6, and 302-7 respectively include "GEORGIA (U.S. state)," "CHINESE LANGUAGE," "RUSSIA," "GEORGIA (country)," "UNIVERSITY," "WAR," and "POLAND." Related (e.g., semantically related) entities are connected by links 308 (e.g., links 308-1 to 308-7). Note that a clustering coefficient might be obtained for each of entities 302-1 to 302-7, e.g., in a manner described above in conjunction with FIG. 1. For example, FIG. 3 is simplification that omits some of the neighbors to entities 302-1 to 302-7 that may be used to determine the clustering coefficients of entities 302-1 to 302-7.

The location of the particular (e.g., ranked) entity within the character string might be determined in response to determining that the particular entity is in the character string. For example, the location of the particular entity in a single line of text might be expressed by a number of characters and spaces the first character of the particular entity is from a first character in the line of text, such as from the left-most character in the line of text. For example, the location of the particular entity 302-3 that includes "RUSSIA" (FIG. 3) in a line that includes the character string; "Georgia is a country near Russia." and starts with "Georgia," the first character ("R") in "Russia" might be 21 characters and five (5) spaces from the "G" in "Georgia."

For multiple lines of text, the location of the particular entity in a particular line of text might, be expressed by the number of the particular line within the text and the number of characters and spaces the first character of the particular entity is from a first character in the particular line of text, such as from the left-most character in the particular line of text.

The particular entity might be extracted from the character string in response to determining that the particular entity is in the character string, for example. Extracted entities can be used to summarize, categorize, and/or label the character string, for example. That is, for example, if the character string is a document, then the extracted entities can be used to summarize, categorize, and/or label that document.

In an example, the path lengths of the paths between entities in a knowledge graph might be determined. For example, the path length of the path that connects two entities may be indicative of the similarity between the two entities. A shorter path length between two entities may be indicative of a greater similarity between the two entities than a longer path, for example. The length of a link 108 in FIG. 1, for example, may be weighted according to the similarity between the entities 102 connected by that link 108. For example, a weighted path length of a path might be referred to as a weight of the path that is indicative of the similarity between the two entities connected by (e.g., at the respective ends of) the path.

The length of a path that includes only a single link that connects two entities, such as link 108-3 in FIG. 1 that connects entity 102-11 and entity 102-2, may be the weighted length of that link. The length of a path that connects two entities, such as the path that connects entity 102-11 to entity 102-9, and that includes a plurality of links, such as links 108-8 and 108-9, may be the sum of the weighted lengths of the plurality of links, such as the sum of the weighted lengths of links 108-8 and 108-9.

A weighted length of a link may be calculated from 1−[(the number of neighbors common to the two entities connected by the link)/(the number of neighbors of one of the two entities connected by the link+the number of neighbors of the other of the two entities connected by the link)].

For example, for calculating the weighted length of link 108-3 in FIG. 1, and thus the weighted length of the path that connects entity 102-11 to entity 102-2, the number of neighbors common to entity 102-11 and entity 102-2 connected by link 108-3 is two (2) (entities 102-1 and 102-10 are neighbors common to entity 102-11 and entity 102-2); the number of neighbors to entity 102-11 is five (5) (entities 102-1, 102-2, 102-10, 102-11, and 102-13 are neighbors of entity 102-11); and the number of neighbors to entity 102-2 is four (4) (entities 102-1, 102-3, 102-10, and 102-11 are neighbors to entity 102-2). Therefore, the weighted length of link 108-3=1−[2/(5+4)]=0.78.

For calculating the weighted length of link 108-6, and thus the length (e.g., the weighted length) of the path that connects entity 102-11 to entity 102-10, the number of neighbors common to entity 102-11 and entity 102-10 connected by link 108-6 is one (1) (entity 102-2 is a neighbor common to entity 102-11 and entity 102-10); the number of neighbors to entity 102-11 is five (5): and the number of neighbors to entity 102-10 is two (2) (entities 102-2 and 102-11 are neighbors to entity 102-10). Therefore, the weighted length of link 108-6=1−[1/(5+2)]=0.86.

For calculating the weighted length of the path that connects, entity 102-11 to entity 102-9 and that includes link 108-8 and link 108-9, the weighed lengths of link 108-8 and link 108-9 are calculated and summed (e.g. added together). For calculating the weighted length of link 108-8 that connects entity 102-11 to 102-12, the number of neighbors common to entity 102-11 and entity 102-12 connected by link 108-8 is zero (0): the number of neighbors to entity 102-11 is five (5); and the number of neighbors to entity 102-12 is two (2) (entities 102-9 and 102-11 are neighbors of entity 102-12). Therefore, the weighted length of link 108-8=1−[0/(5+2)]=1.

For calculating the weighted length of link 108-9 that connects entity 102-9 to 102-12, the number of neighbors common to entity 102-9 and entity 102-12 connected by link 108-9 is zero (0); the number of neighbors to entity 102-12 is two (2); and the number of neighbors to entity 102-9 is two (2) (entities 102-4 and 102-12 are neighbors to entity 102-9). Therefore, the weighted length of link 108-9=1−[0/(2+2)]=1, and the weighted length of the path that connects entity 102-11 to entity 102-9=1+1=2.

Note that the length of the path that connects two entities may be indicative the similarity between the two entities, e.g., where the shorter the path length the greater the similarity between the two entities connected by the path. For the present example, the length of path that connects the entity 102-11 that includes "INVENTION" to the entity 102-2 that includes "PATENT" is 0.78; the length of path that connects the entity 102-11 that includes "INVENTION" to the entity 102-10 that includes "PATENT ATTORNEY" is 0.86; and the length of path that connects the entity 102-11 that includes "Invention" to the entity 102-9 that includes "TELEGRAPHY" is 2.

Therefore, entity 102-11, and thus "INVENTION," may be more similar to entity 102-2, and thus "PATENT," than entity 102-11, and thus "INVENTION," is to entity 102-10, and thus "PATENT ATTORNEY," Moreover, entity 102-11, and thus "INVENTION," may be more similar to entity 102-2, and thus "PATENT," and to entity 102-10, and thus "PATENT ATTORNEY," than entity 102-11, and thus "INVENTION," is to entity 102-9, and thus "TELEGRAPHY."

In some examples, it might be determined that entity 102-11 is in a character string, e.g., entity 102-11 might be extracted from the character string. Since entity 102-11 is in the knowledge graph 100, it is an unambiguous entity. For example, entity 102-11 might be a ranked entity included in the list described above and might be extracted in response to it matching characters in the character string.

It might be further determined that an ambiguous entity is in a character string, e.g., the ambiguous entity might be extracted from the character string. For example, the ambiguous entity might be extracted in response to matching an entity known to be ambiguous. For example, the entity known to be ambiguous might have been added to the list in which entity 102-11 might be included.

In order to determine an appropriate unambiguous meaning of the ambiguous entity within the context of the character string, the ambiguous entity should be disambiguated to an unambiguous entity in the knowledge graph that best fits the context of the character string. For purposes of this example, potential unambiguous meanings of the ambiguous entity might correspond to the unambiguous entities 102-2, 102-10, and 102-9 that are connected to the extracted entity 102-11.

The ambiguous entity might be taken to mean a certain entity of a plurality of entities, such as unambiguous entities 102-2, 102-10, and 102-9, in the knowledge graph that are connected to the particular entity (e.g., where the particular entity is present in the character string), such as entity 102-11, and that are potential meanings of the ambiguous entity, in response to determining, that the certain entity is more similar to the particular entity than the other entities of the plurality of entities. For example, the ambiguous entity might be taken to mean entity 102-2 in response to determining that entity 102-2 is more similar to entity 102-11 than entities 102-10 and 102-9. That is, for example, the ambiguous entity may be disambiguated to entity 102-2.

Note that entity 102-2 was determined to more similar to entity 102-11 than entities 102-10 and 102-9. For example, entity 102-2 may be determined to be more similar to entity 102-11 than entities 102-10 and 102-9 by determining that the path length of the path (0.78 in the example above) connecting entity 102-11 to entity 102-2 is shorter than the path length of the path (0.86 in the example above) connecting entity 102-11 to entity 102-10 and the path length of the path (2 in the example above) connecting entity 102-11 to entity 102-9.

Note that the path lengths for use in the disambiguation may be determined directly from an original (e.g., raw), unmodified knowledge graph of a knowledge base, e.g., an as-received knowledge graph, such as a knowledge graph received directly from an outside source, such as Wikipedia. This avoids the need to determine path lengths from additional graphs based partially on the original knowledge graph and partially on a set of, e.g., possibly ambiguous terms.

Note that unambiguous entities 102-2, 102-10, and 102-9 might also be ranked, e.g., based on their clustering coefficients. For example, entities 102-2, 102-10, and 102-9 might be included in the list in which entity 102-11 might be included. Note, however, that entities 102-2, 102-10, and 102-9 might not expressly included in the character string. That is, for example, entities 102-2, 102-10, and 102-9 might not match characters in the character string.

In some examples, a determination may be made of the path lengths of respective paths within the knowledge graph that respectively connect the particular entity, e.g., extracted particular entity 102-11, to entities of a plurality of entities (e.g., entities 102-2, 102-10, and 102-9) in the knowledge graph, e.g., that are potential meanings of an ambiguous entity in a character string. Respective similarities between the extracted entity and the entities of the plurality of entities may be indicated by the path lengths of the respective paths, e.g., the length of the path connecting entity 102-11 to entity 102-2, the length of the path connecting entity 102-11 to entity 102-10, and the length of the path connecting entity 102-11 to entity 102-9.

For example, the ambiguous entity in the character string may be disambiguated by taking the ambiguous entity to mean a certain entity (e.g., entity 102-2) of the plurality of entities 102-2, 102-10, and 102-9. The path length of the respective path that connects the extracted entity 102-11 to the certain entity 102-2, for example, indicates a respective similarity that is greater than the respective similarity indicated by any other of the respective paths, e.g., the path connecting entity 102-11 to entity 102-10 and the path connecting entity 102-11 to entity 102-9.

Consider further the example of FIG. 3 in conjunction with the character string: "Georgia has a university and is near Russia." "Georgia" might be extracted from the character string as an ambiguous entity that should be disambiguated. For example, "Georgia" might be extracted in response to matching an entity known to be ambiguous. That is, for example, "Georgia" might be an entity known to be ambiguous.

"Russia" may be extracted from the character string, e.g., in response to matching the entity "RUSSIA" in the portion 301 of the knowledge graph. Note that "RUSSIA" might be a particular entity that is selected from the knowledge graph, e.g., as in block 210 of FIG. 2. As such, "RUSSIA" is an unambiguous entity, in that it appears in the knowledge graph. "University" may be extracted from the character string, e.g., in response to matching the entity "UNIVERSITY" in the portion 301 of the knowledge graph. Note that "UNIVERSITY" might be a particular entity that is selected from the knowledge graph, e.g., as in block 210 of FIG. 2. As such, "UNIVERSITY is an unambiguous entity, in that it appears in the knowledge graph. Note that the entities "RUSSIA," "UNIVERSITY," "GEORGIA (U.S. state)," and "GEORGIA (country)" in the knowledge graph might be ranked, e.g., based on their calculated clustering coefficients. Also note that "GEORGIA (U.S. state)" and "GEORGIA (country)" do not appear in the character string.

"Georgia" is ambiguous because it could correspond to either of the unambiguous entities "GEORGIA (U.S. state)" and "GEORGIA (country)." To disambiguate "Georgia" to the context of the character string, it is determined which of unambiguous entities "GEORGIA (U.S. state)" or "GEORGIA (country)" is more similar to other unambiguous entities, such as "RUSSIA" and/or "UNIVERSITY" or a combination of RUSSIA" and "UNIVERSITY," that were extracted from the character string. That is, for example, an unambiguous entity that is more similar to an unambiguous entity appearing in (e.g., extracted from) the character string is more likely to fit the context of the character string than an unambiguous entity that is less similar to the unambiguous entity appearing in the character string.

In FIG. 3, the length of each of the links 308-1 to 308-7 might be determined in the manner described above in conjunction with FIG. 1 and might be one (1). The path length of the path that connects "GEORGIA (country)" to "RUSSIA" is the length of link 308-3, and is thus one (1). The path length of the path that connects "GEORGIA (U.S. state)" to "RUSSIA" is the sum of the lengths of links 308-1 and 308-2 and is thus two (2). Since the length of the path that connects "GEORGIA (country)" to "RUSSIA" is shorter than the length of the path that connects "GEORGIA (U.S. state)" to "RUSSIA," "GEORGIA (country)" is more similar to "RUSSIA" than "GEORGIA (U.S. state)," and thus "Georgia" could be disambiguated to "GEORGIA (country)." This might be sufficient for disambiguating "Georgia" in a character string, such as "Georgia is near Russia," for example.

The path length of the path that connects "GEORGIA (U.S. state)" to "UNIVERSITY" is the length of link 308-4, and is thus one (1). The path length of the path that connects "GEORGIA (country)" to "UNIVERSITY" is the sum of the lengths of links 308-5, 308-6, and 308-7 and is thus three (3). Since the length of the path that connects "GEORGIA (U.S. state)" to "UNIVERSITY" is shorter than the length of the path that connects "GEORGIA (country)" to "UNIVERSITY," "GEORGIA (U.S. state)" is more similar to "UNIVERSITY" than "GEORGIA (country)," and thus "Georgia" could be disambiguated to "GEORGIA (U.S. state)." This might be sufficient for disambiguating "Georgia" in a character string, such as "Georgia has a university," for example.

However, for the present example involving the character string: "Georgia has a university and is near Russia," we might include both "RUSSIA" and "UNIVERSITY" in the disambiguation to better capture the context of the string. The path length of the path that connects "GEORGIA (U.S. state)" to "UNIVERSITY" and the path length of the path that connects "GEORGIA (U.S. state)" to "RUSSIA" may be combined to determine a combined path length value for GEORGIA (U.S. state). The combined path length value for GEORGIA (U.S., state), for example, may be the mean of the path length of the path that connects "GEORGIA (U.S. state)" to "UNIVERSITY" and the path length of the path that connects "GEORGIA (U.S. state)" to "RUSSIA."

For example, the combined path length value for GEORGIA (U.S. state) may be the sum of the path length of the path that connects "GEORGIA (U.S. state)" to "UNIVERSITY" and the path length of the path that connects "GEORGIA (U.S. state)" to "RUSSIA," which is 1+2=3, divided by the number of paths, which is two (2). That is, for example, the combined path length value for GEORGIA (U.S. state) is 3/2=1.5. In some examples, the combined, path length value for GEORGIA (U.S. state) might be referred to as the combined path length value for the paths that connect "RUSSIA" and "UNIVERSITY" to "GEORGIA (U.S. state)," e.g., the path that connects "GEORGIA (U.S. state)" to "UNIVERSITY" and the path that connects "GEORGIA (U.S. state)" to "RUSSIA."

The path length of the path that connects "GEORGIA (country)" to "UNIVERSITY" and the path length of the path that connects "GEORGIA (country)" to "RUSSIA" may be combined to determine a combined path length value for GEORGIA (country). For example, the combined path length value for GEORGIA (country) may be the mean of the path length of the path that connects "GEORGIA (country)" to "UNIVERSITY" and the path length of the path that connects "GEORGIA (country)" to "RUSSIA."

For example, the combined path length value for GEORGIA (country) may be the sum of the path length of the path that connects "GEORGIA (country)" to "UNIVERSITY" and the path length of the path that connects "GEORGIA (country)" to "RUSSIA," which is 3+1=4, divided by the number of paths, which is two (2). That is, for example, the combined path length value for "GEORGIA (country)" is 4/2=2. In some examples, the combined path length value for GEORGIA (country) might be referred to as the combined path length value for the paths that connect "RUSSIA" and "UNIVERSITY" to "GEORGIA (country)," e.g., the path that connects "GEORGIA (country)" to "UNIVERSITY" and the path that connects "GEORGIA (country)" to "RUSSIA."

"Georgia" may be disambiguated by taking it to mean "GEORGIA (U.S. state)," in response to determining that the combined path length value for "GEORGIA (U.S. state)" is less than the combined path length value "GEORGIA (country)." Note, for example, that the combined path length value may be a measure of the similarity between a combination of a plurality of entities in knowledge graph, such as "RUSSIA" and "UNIVERSITY," and a single entity in the knowledge graph, such as "GEORGIA (country)" or "GEORGIA (U.S. state)," connected to the combination of the plurality of entities. That is, the lower the combined path length value, the greater the similarity. Hence the combination of "RUSSIA" and "UNIVERSITY" is more similar to "GEORGIA (U.S. state)" than to "GEORGIA (country)."

Figure 4:
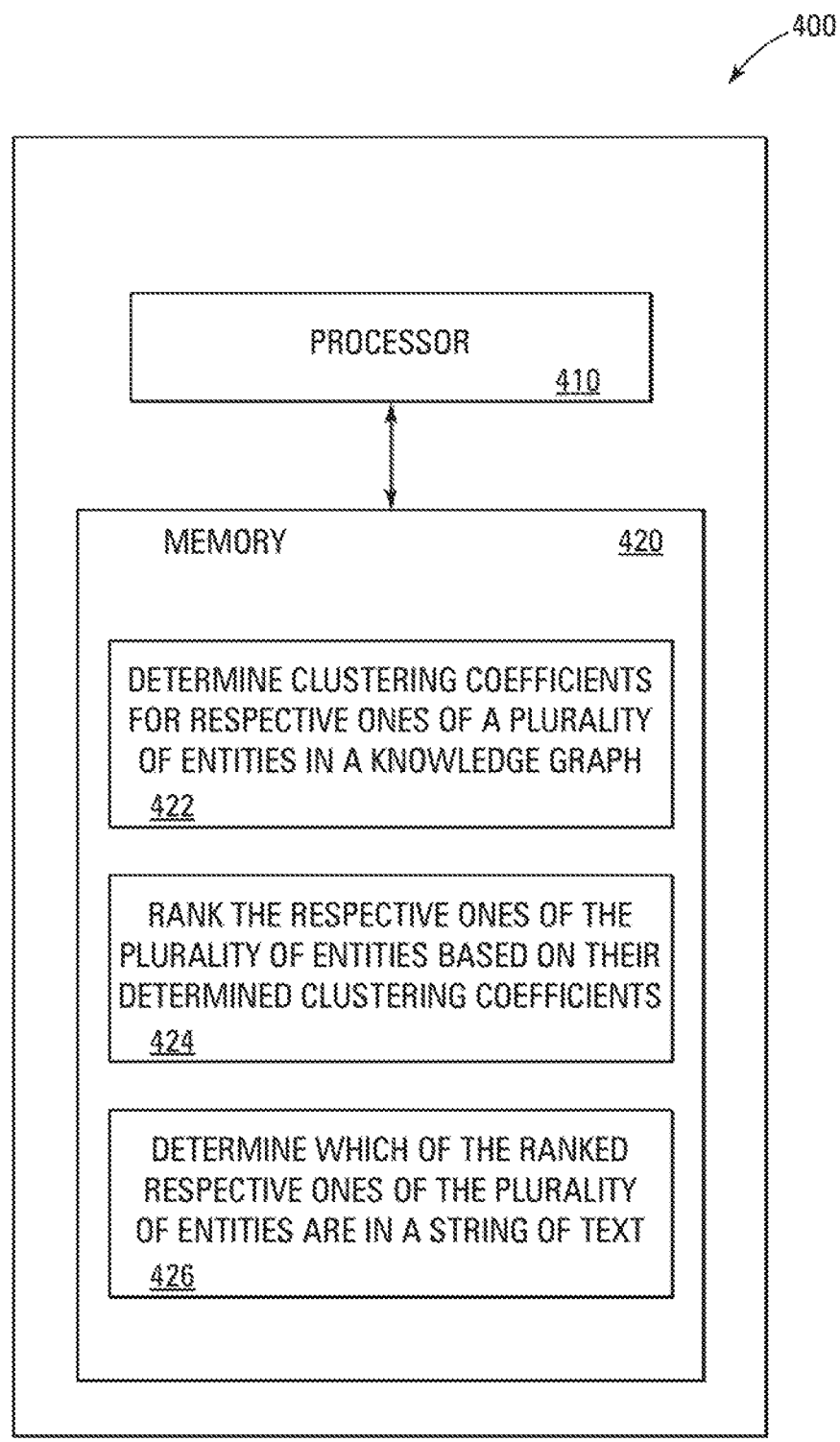
FIG. 4 is a block diagram that illustrates an example of a computer.

FIG. 4 is a block diagram that illustrates an example of a computer 400 to perform the methods described herein, e.g., including the methods described above in conjunction with FIGS. 1-3. Computer 400 includes a processor 410 to perform the methods described herein, e.g., including the methods described above in conjunction with FIGS. 1-3.

A memory 420 is coupled to the processor 410. Memory 420 might be a non-transitory machine-readable storage medium encoded with instructions executable by processor 410. Memory 420 may be in the form of software, firmware, hardware, or a combination thereof. In a hardware solution, the machine-readable instructions may be hard coded as part of processor 410, e.g., an application-specific integrated circuit (ASIC) chip. In a software or firmware solution, the instructions may be stored for retrieval by the processor 410. Some additional examples of non-transitory machine-readable storage media may include static or dynamic random access memory (SRAM or DRAM), read-only memory (ROM), electrically erasable programmable ROM (EEPROM) memory, such as flash memory, magnetic media and optical media, whether permanent or removable, etc. Some consumer-oriented computer applications are software solutions provided to the user in the form of downloads, e.g., from the Internet, or removable non-transitory machine-readable media, such as a compact disc read-only memory (CD-ROM) or digital video disc (DVD).

A storage device (not shown), such as a hard drive, removable flash memory, etc., may be coupled to processor 410 in some examples. The storage device might be used to store, for example, a list, such as the list of ranked entities described above, e.g., to which ambiguous entities might be added. Alternatively, ambiguous entities might be stored in the storage device separately from the list of ranked entities.

In some examples, path lengths, such as path lengths determined in a manner described above in conjunction with FIG. 1, might be stored in the storage device. Clustering coefficients and combined path length values might also be stored in the storage device.

Computer 400 may be coupled to a data network, such as the Internet, a Local Area Network (LAN), etc., via an interface (not shown). In some examples, computer 400 may be a server computer and may be accessible to users via a website, e.g. for on-demand usage. Processor 410 may receive a knowledge graph, such as knowledge graph 100, e.g., from the data network, and a character string (e.g., a string of text), e.g., from a user.

Memory 420 is encoded with instructions at block 422 to allow processor 410 to determine clustering coefficients for respective ones of a plurality of entities in a knowledge graph. The instructions at block 424 allow processor 410 to rank the respective ones of the plurality of entities based on their determined clustering coefficients. The instructions at block 426 allow processor 410 to determine which of the ranked respective ones of the plurality of entities is in a string of text.

For example, there may be instructions that may allow processor 410 to determine weights, e.g., weighted path lengths, of respective paths that connect respective entities in the knowledge graph that are potential meanings of an ambiguous entity in the string of text to a particular ranked entity that is in the string of text, where the weights are indicative of similarities of the respective entities to the particular ranked entity.

There may be instructions that may allow processor 410 to take the meaning of the ambiguous entity to be the respective entity that is connected to the particular ranked entity by a respective path having a weight indicative of a similarity of that respective entity to the particular ranked entity that is greater than the similarities of other of the respective entities to the particular ranked entity indicated by the weights of the other respective paths, for example.

The instructions to allow the processor to determine which of the ranked respective ones of the plurality of entities are in the string of text may allow the processor to determine which of the ranked respective ones of the plurality of entities that have clustering coefficients above a certain value are in the string of text.

Figure 5:
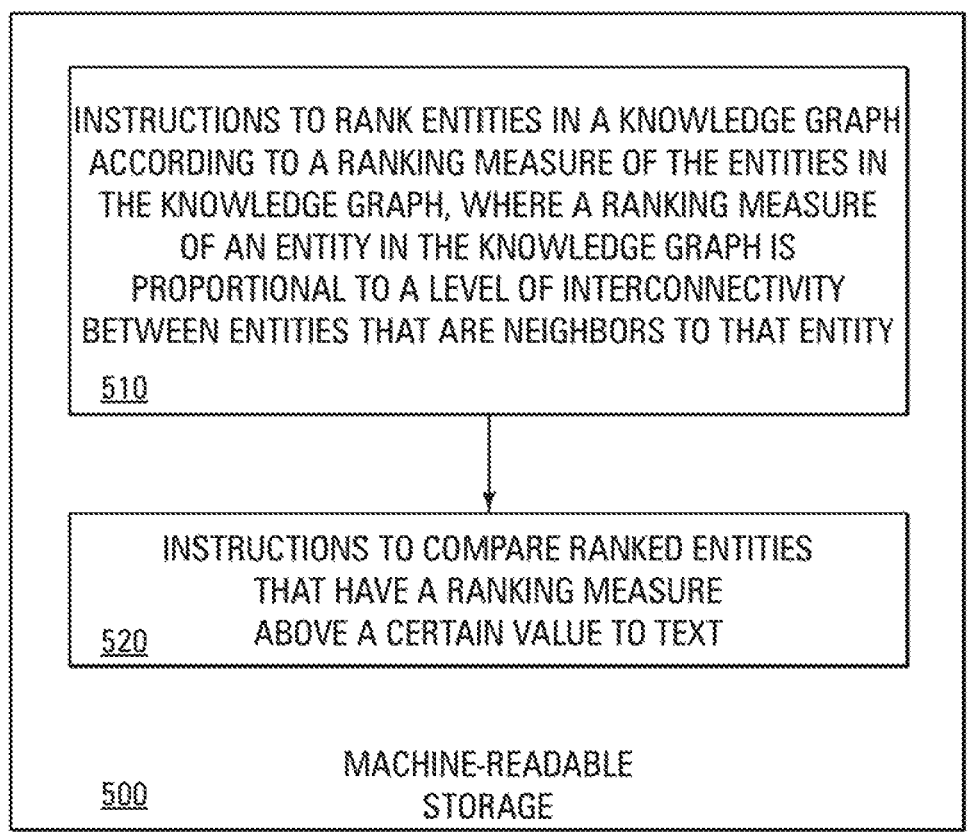
FIG. 5 is a block diagram of an example of machine-readable storage.

FIG. 5 is a block diagram of an example of a non-transitory machine-readable storage medium 500. For example, non-transitory machine-readable storage medium 500 might be included in a computer, such as computer 400, and might be coupled to a processor of the computer, such as the processor 410 of computer 400. In some examples, non-transitory machine-readable storage medium 500 might be as described above for the non-transitory machine-readable storage medium of memory 420.

In some examples, non-transitory machine-readable storage medium 500 might an application-specific integrated circuit (ASIC) chip, e.g., as a part of the processor. In other examples, non-transitory machine-readable storage medium 500 may be static or dynamic random access memory (SRAM or DRAM), read-only memory (ROM), electrically erasable programmable ROM (EEPROM) memory, such as flash memory, a magnetic medium or an optical medium, whether permanent or removable, compact disc read-only memory (CD-ROM), digital video disc memory (DVD), etc.

Non-transitory machine-readable storage medium 500 is encoded with instructions executable by the processor, such as processor 410. In the example of FIG. 5, non-transitory machine-readable storage medium 500 includes instructions 510 to rank entities in a knowledge graph according to a ranking measure, such as a clustering coefficient, of the entities in the knowledge graph, where a ranking measure of an entity in the knowledge graph is proportional to a level of interconnectivity between entities that are neighbors to that entity. Non-transitory machine-readable storage medium 500 includes instructions 520 to compare ranked entities that have a ranking measure above a certain value to text. This, for example, reduces the number of comparisons as opposed to when all of the entities in a knowledge graph may be compared to the text.

There may be instructions that may be to identify portions of the text that respectively match the ranked entities from the knowledge graph to which the text is compared, for example. For example, identifying (e.g., only) portions of the text that respectively match the ranked entities from the knowledge graph that have clustering coefficients above a certain value might preclude the identification of portions of the text that match entities from the knowledge graph that have clustering coefficients below the certain value that may have less specific meanings than the ranked entities that have clustering coefficients above the certain value. Note, for example, that entities in the knowledge graph with higher clustering coefficients might have more specific meanings than entities in the knowledge graph with lower clustering coefficients.

There may be instructions that may be to disambiguate an ambiguous entity in the text based on quantities that are respective measures of similarity (e.g., that are the lengths of paths) between a ranked entity determined to be in the text and respective entities in the knowledge graph that are potential meanings of the ambiguous entity. Note, for example, that a ranked entity may be an entity in the knowledge graph and may be ranked according to a ranking measure, such as the clustering coefficient. A ranked entity may be determined to be in the character string as a result of comparing that entity to the character string, e.g., as a result of the ranked entity matching a portion of the text.

There may be instructions that may be to determine path lengths of paths in the knowledge graph, e.g., as described above in conjunction with FIG. 1, that respectively connect a ranked entity determined to be in the text to respective other entities in the knowledge graph that are potential meanings of an ambiguous entity in the text and to take the ambiguous entity to mean the respective other entity that is connected to the ranked entity determined to be in the text by a path having a shortest path length of the determined path lengths. The knowledge graph might be an as-received, unmodified knowledge graph, for example.

There may be instructions that may be to determine a first combined path length value for first paths that connect first and second ranked entities determined to be in the text to a first certain entity in the knowledge graph that is a potential meaning of an ambiguous entity (e.g., "Georgia") in the text, such as the combined path length value for the paths that, connect "RUSSIA" and "UNIVERSITY" to "GEORGIA (U.S. state)," e g., as described above in conjunction with FIG. 3. There may be instructions that may be to determine a second combined path length value for second paths that connect the first and second ranked entities to a second certain entity in the knowledge graph that is a potential meaning of the ambiguous entity in the text such as the combined path length value for the paths that connect "RUSSIA" and "UNIVERSITY" to "GEORGIA (country)," e.g., as described above in conjunction with FIG. 3. There may be instructions that may be to take the ambiguous entity in the text to mean the first certain entity, e.g., "GEORGIA (U.S. state)," in response to determining that the first combined path length value is less than the second combined path length value, e.g., as described above in conjunction with FIG. 3.

Although specific examples have been illustrated and described herein it is manifestly intended that the scope of the claimed subject matter be limited only by the following claims and equivalents thereof.

What is claimed is:

1. A method, comprising:
   receiving, by a processor of a computing device, a knowledge graph that includes a plurality of entities connected to each other via links, wherein each entity corresponds to a page in a knowledge database;
   determining, by the processor, levels of connectivity for the plurality of entities in the knowledge graph, wherein a level of connectivity for each entity is determined based on a total number of connected triples for the entity and a total number of closed triples for the entity, wherein a connected triple for the entity is a string of three entities, including the entity and two neighbors of the entity in the knowledge graph, connected to each other in a row in which the entity is in a middle position of the string, and wherein a closed triple for the entity is when the three entities are connected to each other in a closed loop;
   based on the levels of connectivity for the plurality of entities, selecting, by the processor, a particular entity from the plurality of entities in the knowledge graph when the level of connectivity for the particular entity is higher than the levels of connectivity for other entities in the knowledge graph;
   determining, by the processor, whether the particular entity is in a character string; and
   in response to a determination that the particular entity is in the character string, creating, by the processor, a hyperlink between a portion of a text string and the particular entity stored in the knowledge database determined to correspond to the portion of the text string.

2. The method of claim 1, comprising:
   in response to a determination that the particular entity is in the character string, taking an ambiguous entity in the character string to mean a certain entity in the knowledge graph that is a potential meaning of the ambiguous entity and that is connected to the particular entity, wherein the certain entity is determined to be more similar to the particular entity than any other entity in the knowledge graph that is a potential meaning of the ambiguous entity and that is connected to the particular entity.

3. The method of claim 2, wherein the certain entity, that is more similar to the particular entity than any other entity in the knowledge graph, is connected to the particular entity by a shorter path than is any other entity.

4. The method of claim 1, wherein the level of connectivity for each entity in the knowledge graph is determined by dividing the total number of the closed triples for the entity by the total number of the connected triples for the entity.

5. The method of claim 1, further comprising:
   determining a location of the particular entity within the character string in response to determining that the particular entity is in the character string.

6. The method of claim 1, wherein each of the neighbors of the particular entity in the knowledge graph is connected to the particular entity by a single link.

7. The method of claim 1, further comprising:
   determining a first path length of a first path within the knowledge graph that connects the particular entity to a first entity in the knowledge graph, wherein the particular entity is determined to be in the character string;
   determining a second path length of a second path within the knowledge graph that connects the particular entity to a second entity in the knowledge graph;
   determining a third path length of a third path within the knowledge graph that connects a third entity in the knowledge graph to the first entity, wherein the third entity is determined to be in the character string;
   determining a fourth path length of a fourth path within the knowledge graph that connects the third entity in the knowledge graph to the second entity;
   combining the first path length and the third path length to generate a combined path length value for the first entity;
   combining the second path length and the fourth path length to generate a combined path length value for the second entity; and
   disambiguating an ambiguous entity in the character string by taking the ambiguous entity to mean the first entity, in response to determining that the combined path length value for the first entity is less than the combined path length value for the second entity.

8. The method of claim 7, wherein the knowledge graph is an as-received, unmodified knowledge graph.

9. A non-transitory computer readable medium storing instructions that when executed cause a processor to:
   receive a knowledge graph that includes a plurality of entities connected to each other via links, wherein each entity corresponds to a page in a knowledge database;
   determine levels of connectivity for the plurality of entities in the knowledge graph, wherein a level of connectivity for each entity is determined based on a total number of connected triples for the entity and a total number of closed triples for the entity, wherein a connected triple for the entity is a string of three entities, including the entity and two neighbors of the entity in the knowledge graph, connected to each other in a row in which the entity is in a middle position of the string, and wherein a closed triple for the entity is when the three entities are connected to each other in a closed loop;
   based on the levels of connectivity for the plurality of entities, select a particular entity from the plurality of entities in the knowledge graph when the level of connectivity for the particular entity is higher than the levels of connectivity for other entities in the knowledge graph;
   determine whether the particular entity is in a character string; and
   in response to a determination that the particular entity is in the character string, create a hyperlink between a portion of a text string and the particular entity stored in the knowledge database determined to correspond to the portion of the text string.

10. The non-transitory computer readable medium of claim 9, wherein the instructions are executable to cause the processor to:
    in response to a determination that the particular entity is in the character string, take an ambiguous entity in the character string to mean a certain entity in the knowledge graph that is a potential meaning of the ambiguous entity and that is connected to the particular entity, wherein the certain entity is determined to be more similar to the particular entity than any other entity in the knowledge graph that is a potential meaning of the ambiguous entity and that is connected to the particular entity.

11. The non-transitory computer readable medium of claim 10, wherein the certain entity, that is more similar to the particular entity than any other entity in the knowledge graph, is connected to the particular entity by a shorter path than is any other entity.

12. The non-transitory computer readable medium of claim 9, wherein the level of connectivity for each entity in the knowledge graph is determined by dividing the total number of the closed triples by the total number of the connected triples for the entity.

13. The non-transitory computer readable medium of claim 9, wherein the instructions are executable to cause the processor to:
determine a location of the particular entity within the character string in response to a determination that the particular entity is in the character string.

14. The non-transitory computer readable medium of claim 9, wherein the instructions are executable to cause the processor to:
determine a first path length of a first path within the knowledge graph that connects the particular entity to a first entity in the knowledge graph, wherein the particular entity is determined to be in the character string;
determine a second path length of a second path within the knowledge graph that connects the particular entity to a second entity in the knowledge graph;
determine a third path length of a third path within the knowledge graph that connects a third entity in the knowledge graph to the first entity, wherein the third entity is determined to be in the character string;
determine a fourth path length of a fourth path within the knowledge graph that connects the third entity in the knowledge graph to the second entity;
combine the first path length and the third path length to generate a combined path length value for the first entity;
combine the second path length and the fourth path length to generate a combined path length value for the second entity; and
disambiguate an ambiguous entity in the character string by taking the ambiguous entity to mean the first entity, in response to a determination that the combined path length value for the first entity is less than the combined path length value for the second entity.

15. A computing device, comprising:
a processor; and
a memory storing instructions that are executable to cause the processor to:
receive a knowledge graph that includes a plurality of entities connected to each other via links, wherein each entity corresponds to a page in a knowledge database;
determine levels of connectivity for the plurality of entities in the knowledge graph, wherein a level of connectivity for each entity is determined based on a total number of connected triples for the entity and a total number of closed triples for the entity, wherein a connected triple for the entity is a string of three entities, including the entity and two neighbors of the entity in the knowledge graph, connected to each other in a row in which the entity is in a middle position of the string, and wherein a closed triple for the entity is when the three entities are connected to each other in a closed loop;
based on the levels of connectivity for the plurality of entities, select a particular entity from the plurality of entities in the knowledge graph when the level of connectivity for the particular entity is higher than the levels of connectivity for other entities in the knowledge graph;
determine whether the particular entity is in a character string; and
in response to a determination that the particular entity is in the character string, create a hyperlink between a portion of a text string and the particular entity stored in the knowledge database determined to correspond to the portion of the text string.

16. The computing device of claim 15, wherein the instructions are executable to cause the processor to:
in response to a determination that the particular entity is in the character string, take an ambiguous entity in the character string to mean a certain entity in the knowledge graph that is a potential meaning of the ambiguous entity and that is connected to the particular entity, wherein the certain entity is determined to be more similar to the particular entity than any other entity in the knowledge graph that is a potential meaning of the ambiguous entity and that is connected to the particular entity.

17. The computing device of claim 16, wherein the certain entity, that is more similar to the particular entity than any other entity in the knowledge graph, is connected to the particular entity by a shorter path than is any other entity.

18. The computing device of claim 15, wherein the level of connectivity for each entity in the knowledge graph is determined by dividing the total number of the closed triples for the entity by the total number of the connected triples for the entity.

19. The computing device of claim 15, wherein the instructions are executable to cause the processor to:
determine a location of the particular entity within the character string in response to a determination that the particular entity is in the character string.

20. The computing device of claim 15, wherein the instructions are executable to cause the processor to:
determine a first path length of a first path within the knowledge graph that connects the particular entity to a first entity in the knowledge graph, wherein the particular entity is determined to be in the character string;
determine a second path length of a second path within the knowledge graph that connects the particular entity to a second entity in the knowledge graph;
determine a third path length of a third path within the knowledge graph that connects a third entity in the knowledge graph to the first entity, wherein the third entity is determined to be in the character string;
determine a fourth path length of a fourth path within the knowledge graph that connects the third entity in the knowledge graph to the second entity;
combine the first path length and the third path length to generate a combined path length value for the first entity;
combine the second path length and the fourth path length to generate a combined path length value for the second entity; and
disambiguate an ambiguous entity in the character string by taking the ambiguous entity to mean the first entity, in response to a determination that the combined path length value for the first entity is less than the combined path length value for the second entity.

* * * * *